United States Patent
Sun et al.

(10) Patent No.: US 11,496,214 B1
(45) Date of Patent: Nov. 8, 2022

(54) EXTINCTION RATIO TESTING SYSTEM FOR OPTICAL TRANSCEIVER MODULE AND EXTINCTION RATIO TESTING METHOD FOR OPTICAL TRANSCEIVER MODULE

(71) Applicant: JESS-LINK PRODUCTS CO., LTD., New Taipei (TW)

(72) Inventors: Chi-Hsien Sun, New Taipei (TW); Chieh-Ming Cheng, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 0 days.

(21) Appl. No.: 17/486,714

(22) Filed: Sep. 27, 2021

(30) Foreign Application Priority Data

Aug. 24, 2021 (TW) .................................. 110131265

(51) Int. Cl.
*H04B 10/077* (2013.01)
*H04B 17/10* (2015.01)

(52) U.S. Cl.
CPC ......... *H04B 10/0775* (2013.01); *H04B 17/10* (2015.01)

(58) Field of Classification Search
None
See application file for complete search history.

(56) References Cited

U.S. PATENT DOCUMENTS

| | | | | |
|---|---|---|---|---|
| 2003/0152118 A1* | 8/2003 | Chieng | ............... | H01S 5/06804 372/33 |
| 2003/0152390 A1* | 8/2003 | Stewart | ................. | H04B 10/40 398/22 |
| 2005/0008280 A1* | 1/2005 | Howley | ................ | H01S 5/0264 385/14 |
| 2006/0036907 A1* | 2/2006 | Inscoe | ................... | G06F 11/263 714/E11.177 |
| 2007/0065151 A1* | 3/2007 | Dybsetter | .............. | H04B 10/40 398/135 |
| 2007/0101214 A1* | 5/2007 | Stauffer | ............. | G01R 31/2855 714/724 |
| 2014/0092394 A1* | 4/2014 | Detofsky | ........... | H04B 10/0731 356/501 |

(Continued)

FOREIGN PATENT DOCUMENTS

| | | |
|---|---|---|
| EP | 1788413 A2 | 5/2007 |
| WO | 2007059258 A1 | 5/2007 |

OTHER PUBLICATIONS

Search Report dated Mar. 10, 2022 of the corresponding European patent application No. 21199560.0.

*Primary Examiner* — Darren E Wolf
(74) *Attorney, Agent, or Firm* — Chun-Ming Shih; HDLS IPR Services

(57) ABSTRACT

An extinction ratio testing system (10) includes a microcontroller (102), an extinction ratio tester (104), and a thermostat (106). The microcontroller (102) controls the thermostat (106) to maintain an optical transceiver module (20) at a predetermined high temperature, and then the microcontroller (102) controls the extinction ratio tester (104) to test an extinction ratio of the optical transceiver module (20). If the extinction ratio is lower than a standard extinction ratio, the microcontroller (102) controls the optical transceiver module (20) to increase a laser operating current (212) of the optical transceiver module (20) to increase the extinction ratio.

8 Claims, 2 Drawing Sheets

(56) References Cited

U.S. PATENT DOCUMENTS

2016/0157075 A1* 6/2016 Ho .................... H04W 56/0015
                                                      455/404.1
2018/0054793 A1* 2/2018 Renaldi .................. H04L 67/52

* cited by examiner

EXTINCTION RATIO TESTING SYSTEM FOR OPTICAL TRANSCEIVER MODULE AND EXTINCTION RATIO TESTING METHOD FOR OPTICAL TRANSCEIVER MODULE

BACKGROUND OF THE DISCLOSURE

Technical Field

The present disclosure relates to an extinction ratio testing system and an extinction ratio testing method, and especially relates to an extinction ratio testing system for an optical transceiver module and an extinction ratio testing method for the optical transceiver module.

Description of Related Art

After the related art optical transceiver module is manufactured, the related art optical transceiver module will be tested in accordance with the testing standards. Only the related art optical transceiver module which passes the testing standards can be guaranteed to have the good performance and thus can be provided to the customers to use.

Among the testing standards for the related art optical transceiver module, the extinction ratio test is an important testing item. The extinction ratio refers to the ratio of the average power of the laser power at logic 1 to the average power of the laser power at logic 0.

The temperature is one of the factors that affect the extinction ratio. In the extinction ratio test for the related art optical transceiver module, the related art optical transceiver module must be tested for the extinction ratio at different temperatures (such as the normal temperature and the high temperature) respectively.

Currently, the problem of the extinction ratio test of the related art optical transceiver module is that the pass rate of the extinction ratio test of the related art optical transceiver module is not high enough, which seriously affects the production capacity of the related art optical transceiver module.

SUMMARY OF THE DISCLOSURE

In order to solve the above-mentioned problems, an object of the present disclosure is to provide an extinction ratio testing system for an optical transceiver module.

In order to solve the above-mentioned problems, another object of the present disclosure is to provide an extinction ratio testing method for the optical transceiver module.

In order to achieve the object of the present disclosure mentioned above, the extinction ratio testing system of the present disclosure is applied to the optical transceiver module. The extinction ratio testing system is characterized by including a microcontroller, an extinction ratio tester, and a thermostat. The microcontroller is electrically connected to the optical transceiver module. The extinction ratio tester is electrically connected to the optical transceiver module and the microcontroller. The thermostat is electrically connected to the microcontroller. Moreover, the extinction ratio testing system is configured to perform a high temperature extinction ratio testing procedure. When the extinction ratio testing system performs the high temperature extinction ratio testing procedure, the microcontroller is configured to control the thermostat to maintain the optical transceiver module at a predetermined high temperature, and then the microcontroller is configured to control the extinction ratio tester to test an extinction ratio of the optical transceiver module. Moreover, when the extinction ratio testing system performs the high temperature extinction ratio testing procedure and the extinction ratio of the optical transceiver module is lower than a standard extinction ratio, the microcontroller is configured to control the optical transceiver module to increase a laser operating current of the optical transceiver module to increase the extinction ratio of the optical transceiver module.

Moreover, in an embodiment of the extinction ratio testing system of the present disclosure mentioned above, the extinction ratio testing system further includes a counter electrically connected to the microcontroller. Moreover, the counter is configured to record a current increasing number that the microcontroller controls the optical transceiver module to increase the laser operating current of the optical transceiver module, wherein the current increasing number means the number of times the microcontroller controls the optical transceiver module to increase the laser operating current of the optical transceiver module. Moreover, when the extinction ratio testing system performs the high temperature extinction ratio testing procedure and the extinction ratio of the optical transceiver module is lower than the standard extinction ratio, if the current increasing number fails to reach three times (namely, the current increasing number does not reach three times; namely, the current increasing number is zero time, one time or two times), the microcontroller is configured to control the optical transceiver module to increase the laser operating current of the optical transceiver module to increase the extinction ratio of the optical transceiver module, and then the counter is configured to increase the current increasing number by one.

Moreover, in an embodiment of the extinction ratio testing system of the present disclosure mentioned above, when the extinction ratio testing system performs the high temperature extinction ratio testing procedure and the extinction ratio of the optical transceiver module is lower than the standard extinction ratio, if the current increasing number reaches three times, the extinction ratio testing system is configured to leave the high temperature extinction ratio testing procedure, and the microcontroller is configured to determine that the optical transceiver module is fail (namely, the extinction ratio of the optical transceiver module is lower than the standard extinction ratio).

Moreover, in an embodiment of the extinction ratio testing system of the present disclosure mentioned above, when the extinction ratio testing system performs the high temperature extinction ratio testing procedure and the extinction ratio of the optical transceiver module is equal to or higher than the standard extinction ratio, the extinction ratio testing system is configured to leave the high temperature extinction ratio testing procedure, and the microcontroller is configured to determine that the optical transceiver module is qualified (namely, the extinction ratio of the optical transceiver module is equal to or higher than the standard extinction ratio).

Moreover, in an embodiment of the extinction ratio testing system of the present disclosure mentioned above, before the extinction ratio testing system performs the high temperature extinction ratio testing procedure, the extinction ratio testing system is configured to perform a normal temperature extinction ratio testing procedure. When the extinction ratio testing system performs the normal temperature extinction ratio testing procedure, the optical transceiver module is configured to be tested for the extinction ratio of the optical transceiver module at a predetermined normal temperature lower than the predetermined high temperature. Moreover, when the extinction ratio testing system performs the normal temperature extinction ratio testing procedure and the extinction ratio of the optical transceiver module is lower than the standard extinction ratio, the extinction ratio testing system is configured to leave the normal temperature extinction ratio testing procedure, and the extinction ratio testing system is configured to determine that the optical transceiver module is fail (namely, the extinction ratio of the optical transceiver module is lower than the standard extinction ratio). Moreover, when the extinction ratio testing system performs the normal temperature extinction ratio testing procedure and the extinction ratio of the optical transceiver module is equal to or higher than the standard extinction ratio, the extinction ratio testing system is configured to leave the normal temperature extinction ratio testing procedure to enter the high temperature extinction ratio testing procedure.

In order to achieve another object of the present disclosure mentioned above, the extinction ratio testing method of the present disclosure is characterized by including following step. Perform a high temperature extinction ratio testing procedure, wherein performing the high temperature extinction ratio testing procedure including following steps. Maintain an optical transceiver module at a predetermined high temperature. Test an extinction ratio of the optical transceiver module. Compare the extinction ratio of the optical transceiver module with a standard extinction ratio. Increase a laser operating current of the optical transceiver module to increase the extinction ratio of the optical transceiver module if the extinction ratio of the optical transceiver module is lower than the standard extinction ratio.

Moreover, in an embodiment of the extinction ratio testing method of the present disclosure mentioned above, performing the high temperature extinction ratio testing procedure further includes following steps. Record a current increasing number that the laser operating current of the optical transceiver module is increased, wherein the current increasing number means the number of times the laser operating current of the optical transceiver module is increased.

Increase the laser operating current of the optical transceiver module to increase the extinction ratio of the optical transceiver module and then increase the current increasing number by one, if the extinction ratio of the optical transceiver module is lower than the standard extinction ratio and the current increasing number fails to reach three times (namely, the current increasing number does not reach three times; namely, the current increasing number is zero time, one time or two times).

Moreover, in an embodiment of the extinction ratio testing method of the present disclosure mentioned above, performing the high temperature extinction ratio testing procedure further includes following step. Leave the high temperature extinction ratio testing procedure and determine that the optical transceiver module is fail (namely, the extinction ratio of the optical transceiver module is lower than the standard extinction ratio), if the extinction ratio of the optical transceiver module is lower than the standard extinction ratio and the current increasing number reaches three times.

Moreover, in an embodiment of the extinction ratio testing method of the present disclosure mentioned above, performing the high temperature extinction ratio testing procedure further includes following step. Leave the high temperature extinction ratio testing procedure and determine that the optical transceiver module is qualified (namely, the extinction ratio of the optical transceiver module is equal to or higher than the standard extinction ratio), if the extinction ratio of the optical transceiver module is equal to or higher than the standard extinction ratio.

Moreover, in an embodiment of the extinction ratio testing method of the present disclosure mentioned above, the extinction ratio testing method further includes following step. Perform a normal temperature extinction ratio testing procedure before performing the high temperature extinction ratio testing procedure. Moreover, performing the normal temperature extinction ratio testing procedure includes following steps. Maintain the optical transceiver module at a predetermined normal temperature lower than the predetermined high temperature. Test the extinction ratio of the optical transceiver module. Compare the extinction ratio of the optical transceiver module with the standard extinction ratio. Leave the normal temperature extinction ratio testing procedure and determine that the optical transceiver module is fail (namely, the extinction ratio of the optical transceiver module is lower than the standard extinction ratio), if the extinction ratio of the optical transceiver module is lower than the standard extinction ratio. Leave the normal temperature extinction ratio testing procedure and enter the high temperature extinction ratio testing procedure, if the extinction ratio of the optical transceiver module is equal to or higher than the standard extinction ratio.

The advantage of the present disclosure is to improve the pass rate of the extinction ratio test for the optical transceiver module.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION OF THE DISCLOSURE

Figure 1:
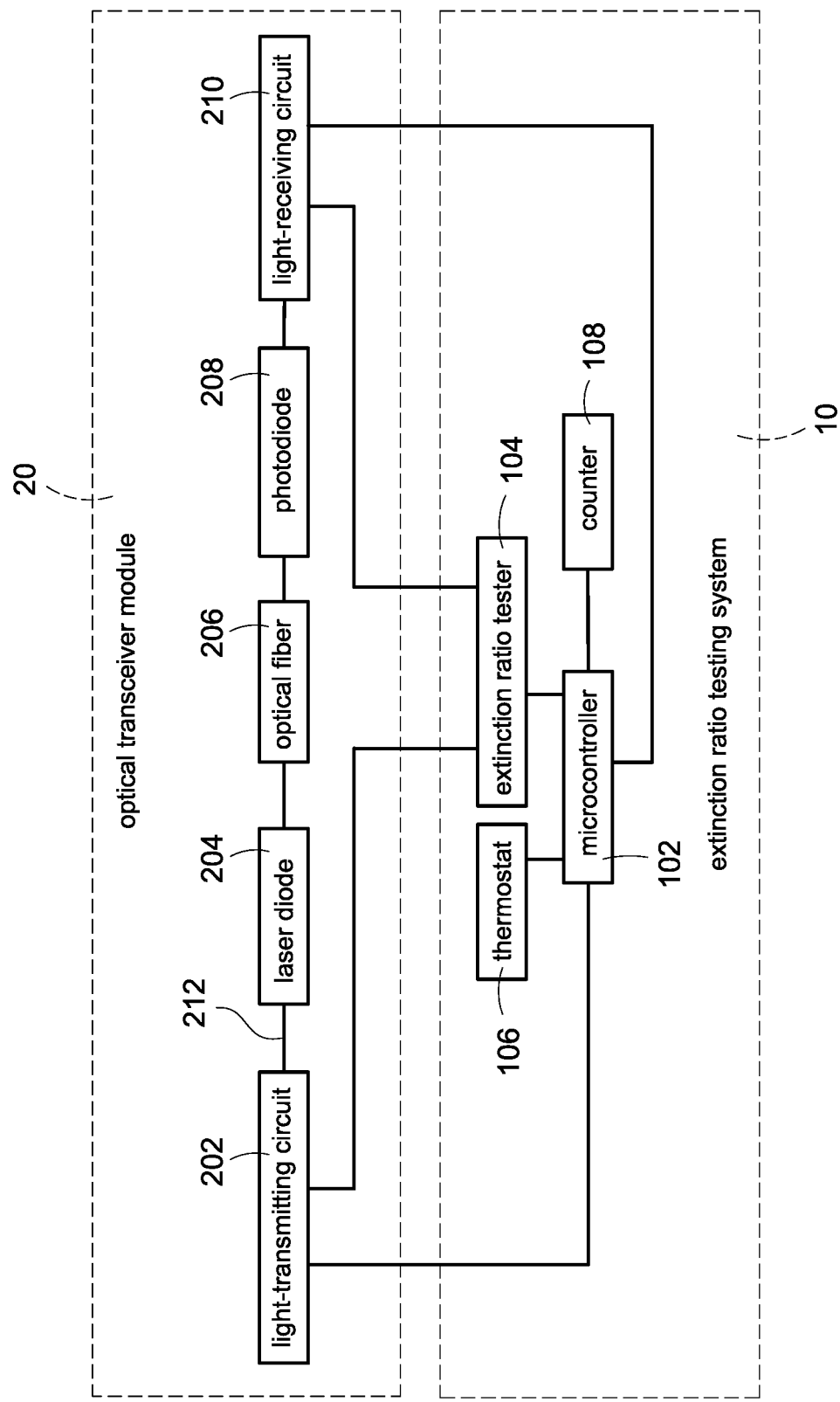
FIG. 1 shows a block diagram of the extinction ratio testing system of the present disclosure applied to the optical transceiver module.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of the extinction ratio testing system of the present disclosure applied to the optical transceiver module. As shown in FIG. 1, an extinction ratio testing system 10 of the present disclosure is applied to an optical transceiver module 20. The extinction ratio testing system 10 includes a microcontroller 102, an extinction ratio tester 104, a thermostat 106 and a thermostat 108. The optical transceiver module 20 includes a light-transmitting circuit 202, a laser diode 204, an optical fiber 206, a photodiode 208 and a light-receiving circuit 210. The components mentioned above are electrically connected to each other.

In an embodiment, the extinction ratio testing system 10 of the present disclosure is configured to firstly perform a normal temperature extinction ratio testing procedure for the optical transceiver module 20; if the optical transceiver module 20 passes the normal temperature extinction ratio testing procedure, then the extinction ratio testing system 10 of the present disclosure is configured to perform a high temperature extinction ratio testing procedure for the optical transceiver module 20; the details are as follows.

When the extinction ratio testing system 10 performs the normal temperature extinction ratio testing procedure for the optical transceiver module 20, the optical transceiver module 20 is arranged in a normal temperature testing chamber (not shown in FIG. 1), and the microcontroller 102 and the extinction ratio tester 104 shown in FIG. 1 are arranged in the normal temperature testing chamber, but neither the thermostat 106 nor the counter 108 is arranged in the normal temperature testing chamber.

Firstly, the extinction ratio testing system 10 performs the normal temperature extinction ratio testing procedure. In the normal temperature extinction ratio testing procedure, the optical transceiver module 20 is at a predetermined normal temperature (for example, 25 degrees Celsius), and the extinction ratio testing system 10 (namely, the microcontroller 102) is configured to control the extinction ratio tester 104 to test an extinction ratio of the optical transceiver module 20. At this time, if the extinction ratio of the optical transceiver module 20 is lower than a standard extinction ratio, the extinction ratio testing system 10 (namely, the microcontroller 102) is configured to leave the normal temperature extinction ratio testing procedure, and the extinction ratio testing system 10 (namely, the microcontroller 102) is configured to determine that the optical transceiver module 20 is fail (namely, the extinction ratio of the optical transceiver module 20 is lower than the standard extinction ratio). But if the extinction ratio of the optical transceiver module 20 is equal to or higher than the standard extinction ratio, the extinction ratio testing system 10 (namely, the microcontroller 102) is configured to leave the normal temperature extinction ratio testing procedure to enter the high temperature extinction ratio testing procedure. Moreover, the standard extinction ratio is, for example but not limited to, 9 dB.

When the extinction ratio testing system 10 performs the high temperature extinction ratio testing procedure for the optical transceiver module 20, the optical transceiver module 20 is arranged in a high temperature testing chamber (not shown in FIG. 1), and the microcontroller 102, the extinction ratio tester 104, the thermostat 106 and the counter 108 shown in FIG. 1 are arranged in the high temperature testing chamber.

In the high temperature extinction ratio testing procedure, the microcontroller 102 is configured to control the thermostat 106 to maintain the optical transceiver module 20 at a predetermined high temperature (for example, 70 degrees Celsius or 85 degrees Celsius) higher than the predetermined normal temperature, and then the microcontroller 102 is configured to control the extinction ratio tester 104 to test the extinction ratio of the optical transceiver module 20.

At this time, if the extinction ratio of the optical transceiver module 20 is equal to or higher than the standard extinction ratio, the extinction ratio testing system 10 is configured to leave the high temperature extinction ratio testing procedure, and the microcontroller 102 is configured to determine that the optical transceiver module 20 is qualified (namely, the extinction ratio of the optical transceiver module 20 is equal to or higher than the standard extinction ratio). But if the extinction ratio of the optical transceiver module 20 is lower than the standard extinction ratio, the microcontroller 102 will firstly check whether a current increasing number reaches three times.

The current increasing number mentioned above means the number of times the microcontroller 102 controls the light-transmitting circuit 202 of the optical transceiver module 20 to increase a laser operating current 212 of the optical transceiver module 20. The counter 108 is configured to record the current increasing number. The light-transmitting circuit 202 is configured to generate and transmit the laser operating current 212 to the laser diode 204 to drive the laser diode 204 to work.

In addition, if the current increasing number fails to reach three times (namely, the current increasing number does not reach three times; namely, the current increasing number is zero time, one time or two times), the microcontroller 102 is configured to control the light-transmitting circuit 202 of the optical transceiver module 20 to increase the laser operating current 212 of the optical transceiver module 20 to increase the extinction ratio of the optical transceiver module 20, and then the counter 108 is configured to increase the current increasing number by one, and the extinction ratio of the optical transceiver module 20 is tested again to be compared with the standard extinction ratio.

In addition, if the current increasing number reaches three times, the extinction ratio testing system 10 is configured to leave the high temperature extinction ratio testing procedure, and the microcontroller 102 is configured to determine that the optical transceiver module 20 is fail (namely, the extinction ratio of the optical transceiver module 20 is lower than the standard extinction ratio).

Moreover, the current increasing number of the present disclosure mentioned above is not limited to three times; for examples, the current increasing number is one time, two times, four times or five times and so on. The laser operating current 212 of the present disclosure mentioned above is increased by 2 mA each time, but the present disclosure is not limited to this.

Figure 2:
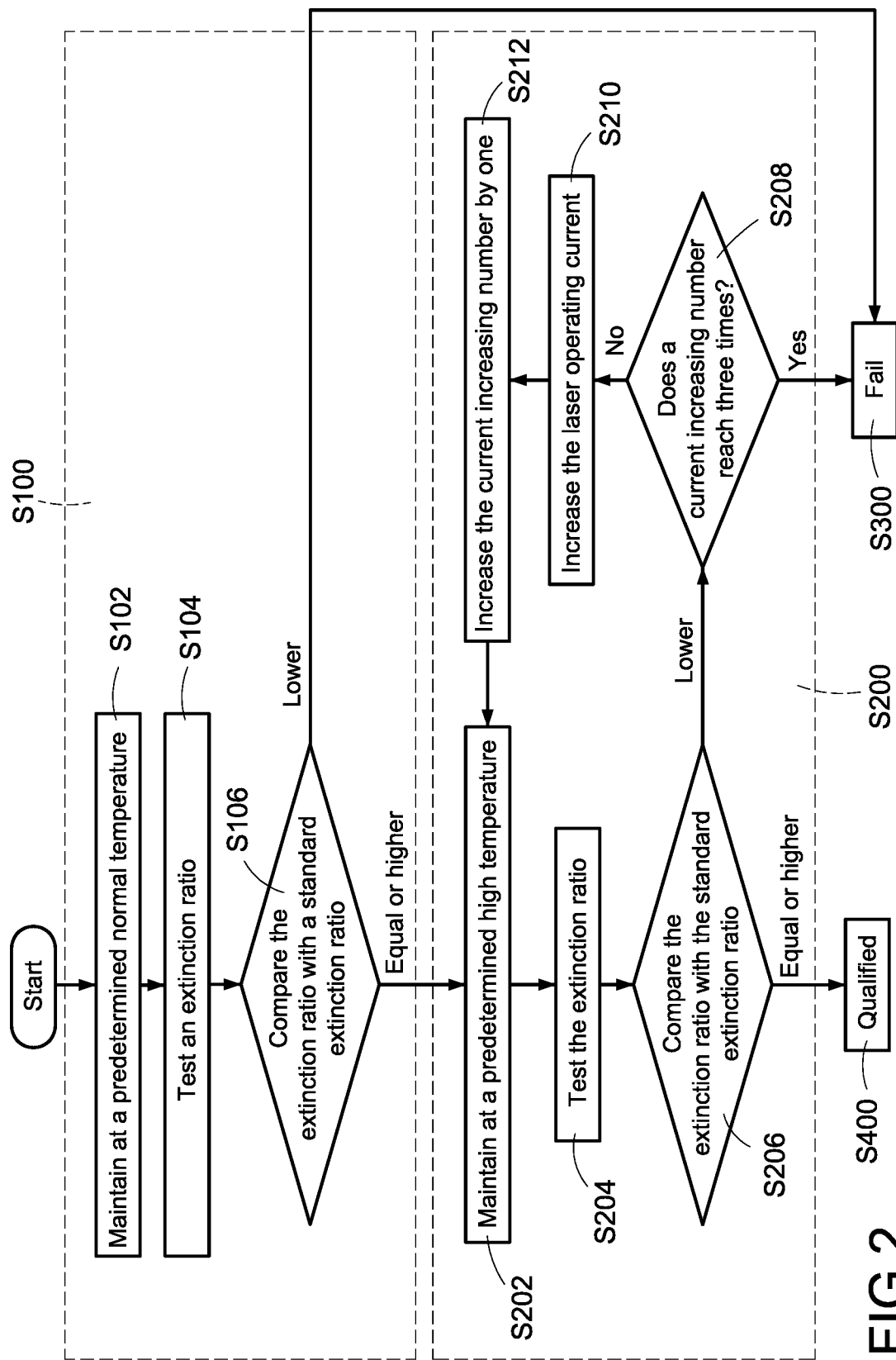
FIG. 2 shows a flow chart of the extinction ratio testing method of the present disclosure.

FIG. 2 shows a flow chart of the extinction ratio testing method of the present disclosure. As shown in FIG. 2, an extinction ratio testing method of the present disclosure mainly includes performing a normal temperature extinction ratio testing procedure (step S100) and performing a high temperature extinction ratio testing procedure (step S200).

Performing the normal temperature extinction ratio testing procedure (step S100) mentioned above includes maintaining an optical transceiver module at a predetermined normal temperature (step S102), testing an extinction ratio of the optical transceiver module (step S104), and comparing the extinction ratio of the optical transceiver module with a standard extinction ratio (step S106).

In the step S106 mentioned above, if the extinction ratio of the optical transceiver module is lower than the standard extinction ratio, the extinction ratio testing method leaves the normal temperature extinction ratio testing procedure and determines that the optical transceiver module is fail (step S300) (namely, the extinction ratio of the optical transceiver module is lower than the standard extinction ratio); if the extinction ratio of the optical transceiver module is equal to or higher than the standard extinction ratio, the extinction ratio testing method leaves the normal temperature extinction ratio testing procedure and enters the high temperature extinction ratio testing procedure (namely, the step S200 mentioned above).

Performing the high temperature extinction ratio testing procedure (step S200) mentioned above includes maintaining the optical transceiver module at a predetermined high temperature higher than the predetermined normal temperature (step S202), testing the extinction ratio of the optical transceiver module (step S204), and comparing the extinction ratio of the optical transceiver module with the standard extinction ratio (step S206).

In the step S206 mentioned above, if the extinction ratio of the optical transceiver module is equal to or higher than the standard extinction ratio, the extinction ratio testing method leaves the high temperature extinction ratio testing procedure and determines that the optical transceiver module is qualified (step S400) (namely, the extinction ratio of the optical transceiver module is equal to or higher than the standard extinction ratio).

In the step S206 mentioned above, if the extinction ratio of the optical transceiver module is lower than the standard extinction ratio, the extinction ratio testing method of the present disclosure enters a step 208, to check whether a current increasing number reaches three times. Moreover, the current increasing number means the number of times a laser operating current of the optical transceiver module is increased.

In the step S208 mentioned above, if the current increasing number fails to reach three times (namely, the current increasing number does not reach three times; namely, the current increasing number is zero time, one time or two times), the extinction ratio testing method increases the laser operating current of the optical transceiver module to increase the extinction ratio of the optical transceiver module (step S210), and then the extinction ratio testing method increases the current increasing number by one (step S212), and then the extinction ratio testing method of the present disclosure returns to the step S202.

In the step S208 mentioned above, if the current increasing number reaches three times, the extinction ratio testing method leaves the high temperature extinction ratio testing procedure and determines that the optical transceiver module is fail (step S300) (namely, the extinction ratio of the optical transceiver module is lower than the standard extinction ratio).

Moreover, the predetermined normal temperature mentioned above is, for example but not limited to, 25 degrees Celsius. The predetermined high temperature mentioned above is, for example but not limited to, 70 degrees Celsius or 85 degrees Celsius. The standard extinction ratio mentioned above is, for example but not limited to, 9 dB. The current increasing number mentioned above is not limited to three times; for examples, the current increasing number is one time, two times, four times or five times and so on. The laser operating current mentioned above is increased by 2 mA each time, but the present disclosure is not limited to this.

The advantage of the present disclosure is to improve the pass rate of the extinction ratio test for the optical transceiver module.

Although the present disclosure has been described with reference to the preferred embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. An extinction ratio testing system (10) applied to an optical transceiver module (20), the extinction ratio testing system (10) characterized by comprising:
    a microcontroller (102) electrically connected to the optical transceiver module (20);
    an extinction ratio tester (104) electrically connected to the optical transceiver module (20) and the microcontroller (102);
    a thermostat (106) electrically connected to the microcontroller (102); and
    a counter (108) electrically connected to the microcontroller (102),
    wherein the extinction ratio testing system (10) is configured to perform a high temperature extinction ratio testing procedure; when the extinction ratio testing system (10) performs the high temperature extinction ratio testing procedure, the microcontroller (102) is configured to control the thermostat (106) to maintain the optical transceiver module (20) at a predetermined high temperature, and then the microcontroller (102) is configured to control the extinction ratio tester (104) to test an extinction ratio of the optical transceiver module (20);
    wherein when the extinction ratio testing system (10) performs the high temperature extinction ratio testing procedure and the extinction ratio of the optical transceiver module (20) is lower than a standard extinction ratio, the microcontroller (102) is configured to control the optical transceiver module (20) to increase a laser operating current (212) of the optical transceiver module (20) to increase the extinction ratio of the optical transceiver module (20);
    wherein the counter (108) is configured to record a current increasing number that the microcontroller (102) controls the optical transceiver module (20) to increase the laser operating current (212) of the optical transceiver module (20);
    wherein when the extinction ratio testing system (10) performs the high temperature extinction ratio testing procedure and the extinction ratio of the optical transceiver module (20) is lower than the standard extinction ratio, if the current increasing number fails to reach three times, the microcontroller (102) is configured to control the optical transceiver module (20) to increase the laser operating current (212) of the optical transceiver module (20) to increase the extinction ratio of the optical transceiver module (20), and then the counter (108) is configured to increase the current increasing number by one.

2. The extinction ratio testing system (10) of claim 1, wherein when the extinction ratio testing system (10) performs the high temperature extinction ratio testing procedure and the extinction ratio of the optical transceiver module (20) is lower than the standard extinction ratio, if the current increasing number reaches three times, the extinction ratio testing system (10) is configured to leave the high temperature extinction ratio testing procedure, and the microcontroller (102) is configured to determine that the extinction ratio of the optical transceiver module (20) is lower than the standard extinction ratio.

3. The extinction ratio testing system (10) of claim 2, wherein when the extinction ratio testing system (10) performs the high temperature extinction ratio testing procedure and the extinction ratio of the optical transceiver module (20) is equal to or higher than the standard extinction ratio, the extinction ratio testing system (10) is configured to leave the high temperature extinction ratio testing procedure, and the microcontroller (102) is configured to determine that the extinction ratio of the optical transceiver module (20) is equal to or higher than the standard extinction ratio.

4. The extinction ratio testing system (10) of claim 3, wherein before the extinction ratio testing system (10) performs the high temperature extinction ratio testing procedure, the extinction ratio testing system (10) is configured to perform a normal temperature extinction ratio testing procedure; when the extinction ratio testing system (10) performs the normal temperature extinction ratio testing procedure, the optical transceiver module (20) is configured to be tested for the extinction ratio of the optical transceiver module (20) at a predetermined normal temperature lower than the predetermined high temperature;

wherein when the extinction ratio testing system (10) performs the normal temperature extinction ratio testing procedure and the extinction ratio of the optical transceiver module (20) is lower than the standard extinction ratio, the extinction ratio testing system (10) is configured to leave the normal temperature extinction ratio testing procedure, and the extinction ratio testing system (10) is configured to determine that the extinction ratio of the optical transceiver module (20) is lower than the standard extinction ratio;

wherein when the extinction ratio testing system (10) performs the normal temperature extinction ratio testing procedure and the extinction ratio of the optical transceiver module (20) is equal to or higher than the standard extinction ratio, the extinction ratio testing system (10) is configured to leave the normal temperature extinction ratio testing procedure to enter the high temperature extinction ratio testing procedure.

5. An extinction ratio testing method characterized by comprising:

performing a high temperature extinction ratio testing procedure (S200), wherein performing the high temperature extinction ratio testing procedure (S200) comprises:

maintaining an optical transceiver module at a predetermined high temperature (S202);

testing an extinction ratio of the optical transceiver module (S204);

comparing the extinction ratio of the optical transceiver module with a standard extinction ratio (S206);

increasing a laser operating current of the optical transceiver module to increase the extinction ratio of the optical transceiver module if the extinction ratio of the optical transceiver module is lower than the standard extinction ratio (S210), recording a current increasing number that the laser operating current of the optical transceiver module is increased (S208); and increasing the laser operating current of the optical transceiver module to increase the extinction ratio of the optical transceiver module (S210) and then increasing the current increasing number by one (S212), if the extinction ratio of the optical transceiver module is lower than the standard extinction ratio and the current increasing number fails to reach three times.

6. The extinction ratio testing method of claim 5, wherein performing the high temperature extinction ratio testing procedure (S200) further comprises:

leaving the high temperature extinction ratio testing procedure and determining that the extinction ratio of the optical transceiver module is lower than the standard extinction ratio, if the extinction ratio of the optical transceiver module is lower than the standard extinction ratio and the current increasing number reaches three times (S300).

7. The extinction ratio testing method of claim 6, wherein performing the high temperature extinction ratio testing procedure (S200) further comprises:

leaving the high temperature extinction ratio testing procedure and determining that the extinction ratio of the optical transceiver module is equal to or higher than the standard extinction ratio, if the extinction ratio of the optical transceiver module is equal to or higher than the standard extinction ratio (S400).

8. The extinction ratio testing method of claim 7, further comprising:

performing a normal temperature extinction ratio testing procedure (S100) before performing the high temperature extinction ratio testing procedure (S200), wherein performing the normal temperature extinction ratio testing procedure (S100) comprises:

maintaining the optical transceiver module at a predetermined normal temperature lower than the predetermined high temperature (S102);

testing the extinction ratio of the optical transceiver module (S104);

comparing the extinction ratio of the optical transceiver module with the standard extinction ratio (S106);

leaving the normal temperature extinction ratio testing procedure and determining that the extinction ratio of the optical transceiver module is lower than the standard extinction ratio, if the extinction ratio of the optical transceiver module is lower than the standard extinction ratio (S300); and leaving the normal temperature extinction ratio testing procedure and entering the high temperature extinction ratio testing procedure, if the extinction ratio of the optical transceiver module is equal to or higher than the standard extinction ratio (S200).

\* \* \* \* \*